(12) United States Patent
Nishimura et al.

(10) Patent No.: US 12,234,386 B2
(45) Date of Patent: Feb. 25, 2025

(54) URETHANE-BASED ADHESIVE FOR AUTOMOBILE

(71) Applicant: Sunstar Engineering Inc., Osaka (JP)

(72) Inventors: Hiroki Nishimura, Osaka (JP); Daisuke Umemoto, Osaka (JP); Takeharu Miyamoto, Osaka (JP)

(73) Assignee: Sunstar Engineering Inc., Osaka (JP)

( * ) Notice: Subject to any disclaimer, the term of this patent is extended or adjusted under 35 U.S.C. 154(b) by 785 days.

(21) Appl. No.: 17/297,624

(22) PCT Filed: Nov. 27, 2019

(86) PCT No.: PCT/JP2019/046384
§ 371 (c)(1),
(2) Date: May 27, 2021

(87) PCT Pub. No.: WO2020/116283
PCT Pub. Date: Jun. 11, 2020

(65) Prior Publication Data
US 2022/0025233 A1    Jan. 27, 2022

(30) Foreign Application Priority Data

Dec. 5, 2018 (JP) .................. 2018-228495

(51) Int. Cl.
| | | |
|---|---|---|
| C09J 175/08 | (2006.01) |
| C08G 18/10 | (2006.01) |
| C08G 18/20 | (2006.01) |
| C08G 18/50 | (2006.01) |
| C08G 18/62 | (2006.01) |
| C08G 18/77 | (2006.01) |
| C08G 18/78 | (2006.01) |
| C08G 18/79 | (2006.01) |

(52) U.S. Cl.
CPC ............ *C09J 175/08* (2013.01); *C08G 18/10* (2013.01); *C08G 18/2081* (2013.01);
(Continued)

(58) Field of Classification Search
CPC .... C08G 18/289; C08G 18/778; C08G 18/10; C08G 18/307; C08G 2170/00; C09J 175/08
See application file for complete search history.

(56) References Cited

U.S. PATENT DOCUMENTS 5,623,044 A * 4/1997 Chiao .................. C08G 18/10
528/28
6,133,395 A   10/2000 Miyata et al.
(Continued)

FOREIGN PATENT DOCUMENTS

EP       2782943 B1    12/2017
JP    H11-507399 A     6/1999
(Continued)

OTHER PUBLICATIONS

International Search Report for corresponding International Application No. PCT/JP2019/046384 mailed Feb. 4, 2020.
(Continued)

*Primary Examiner* — Michael M Dollinger
(74) *Attorney, Agent, or Firm* — Renner, Otto, Boisselle & Sklar, LLP

(57) ABSTRACT

The present invention provides an adhesive composition which is a primerless urethane-based adhesive and has high adhesive force with respect to a polyolefin-based resin. An adhesive composition according to the present invention is a two-liquid type urethane-based adhesive composition comprising: a main agent which comprises (A) a urethane prepolymer having an isocyanate group at the end thereof, (B) a polyfunctional isocyanate compound having an alkoxysilyl group which can be obtained through a reaction of a silane compound having at least two alkoxysilyl groups in one molecule and a polyisocyanate having an isocyanate group at the end thereof and (C1) a first curing catalyst; and
(Continued)

a curing agent which comprises (D) a hydrophobic polyol and (C2) a second curing catalyst.

8 Claims, 1 Drawing Sheet

(52) U.S. Cl.
CPC ..... *C08G 18/5048* (2013.01); *C08G 18/6208* (2013.01); *C08G 18/778* (2013.01); *C08G 18/7831* (2013.01); *C08G 18/7837* (2013.01); *C08G 18/794* (2013.01); *C08G 2170/00* (2013.01); *C09J 2203/354* (2020.08); *C09J 2301/30* (2020.08); *C09J 2423/106* (2013.01)

(56) References Cited

U.S. PATENT DOCUMENTS

| | | | |
|---|---|---|---|
| 2003/0144412 | A1 | 7/2003 | Miyata et al. |
| 2010/0015344 | A1* | 1/2010 | Groenewolt ......... C09D 175/14 427/407.1 |
| 2013/0216840 | A1* | 8/2013 | Radhakrishnan ...... C09J 175/04 428/423.1 |
| 2017/0275509 | A1* | 9/2017 | Zahn .................... C08G 18/307 |

FOREIGN PATENT DOCUMENTS

| | | |
|---|---|---|
| JP | 2001-511216 A | 8/2001 |
| JP | 2003-026756 A | 1/2003 |
| JP | 2005-139319 A | 6/2005 |
| JP | 2005-336429 A | 12/2005 |
| JP | 2006-111811 A | 4/2006 |
| JP | 2014-077094 A | 5/2014 |
| JP | 2017-502147 A | 1/2017 |
| WO | 1994/009046 A1 | 4/1994 |
| WO | 1998/036007 A1 | 8/1998 |
| WO | 2015/100198 A1 | 7/2015 |

OTHER PUBLICATIONS

International Preliminary Report on Patentability for corresponding International Application No. PCT/JP2019/046384 dated Jun. 8, 2021 and English Translation.
Extended European Search Report (EESR) for corresponding European Application No. 19892646.1 dated Jul. 28, 2022.

* cited by examiner

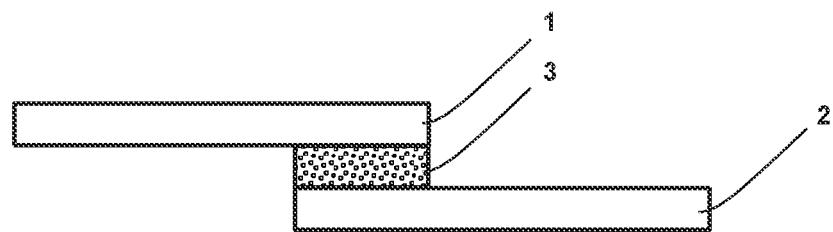

URETHANE-BASED ADHESIVE FOR AUTOMOBILE

CROSS-REFERENCE TO RELATED APPLICATION

This application claims priority to Japanese Patent Application No. 2018-228495, filed on Dec. 5, 2018, the contents of which is hereby incorporated by reference in its entirety.

BACKGROUND OF THE INVENTION

Field of the Invention

The present disclosure relates to a urethane-based adhesive for adhering resin structural materials for automobiles, and a resin structural material and glass. The present disclosure, in particular, provides an adhesive for adhering resin structural materials for automobiles, and a resin structural material and glass in a back door for automobile (a resin back door), the structural material of which is formed of a resin material.

Description of the Related Art

An opening and closing portion attached to a rear part of an automobile body, such as a minivan, a hatchback, a station wagon is referred to as a back door (also referred to as a rear door, a tail gate, a hatch gate etc.). Such a back door may be opened in the lateral direction but, in general, is opened upward by using a damper. In particular, a minivan has larger sized back doors so that a lot of luggage can be loaded and unloaded, and therefore the total weight of the automobile increases. The weight of the back door is needed to be light in order to reduce the load of opening and closing the back door, and also to reduce the total weight of the automobile. Then, in recent years, the number of the back doors which apply a resin material for the structural material has been increasing. Applying the resin material for the structural material, the back doors can have various configurations, and their design can be enhanced.

A polyolefin-based resin is applied for these structural materials. A polyolefin-based resin is, for example, a polypropylene (PP)-based resin (for example, a reinforced polypropylene resin with glass fiber (PPGF), a blend of ethylene-propylene-diene ternary copolymer with polypropylene (PP/EPDM), a reinforced polypropylene resin containing talc (PPTB) etc.). A polyolefin-based resin can contribute to the weight reduction and the moldability while it is a difficult-to-adhesive material. In an outfitting step, the resin body of the resin back door is subjected to a surface modification treatment, such as a frame treatment, a corona treatment and a plasma treatment etc., and a body primer is applied thereon, followed by applying an adhesive to adhere the resin members. Further, a glass primer and an adhesive are applied on a window glass to adhere the resin body and the window glass.

Patent Document 1 discloses a two-liquid type polyurethane resin composition which has excellent cured physical properties such as elongation and hardness, and also has good adhesion to vinyl chloride, especially soft vinyl chloride. Such a polyurethane resin composition comprises a first liquid which comprises a urethane prepolymer (A) and an isocyanate silane compound (B) having at least one urethane bond and/or urea bond in the molecule, and a second liquid comprising a polyol compound, wherein the isocyanate silane compound (B) is a reaction product between an aromatic polyisocyanate such as 2,4-tolylene diisocyanate (2,4-TDI); an aliphatic polyisocyanate etc. such as hexamethylene diisocyanate (HDI) and an aminosilane compound such as N,N-bis[(3-trimethoxysilyl)propyl] amine etc. The isocyanate silane compound (B) is preferably a reaction product between an aromatic polyisocyanate and an aminosilane compound because when the isocyanate silane compound (B) is the reaction product, its NCO group is aromatic so that the adhesion with vinyl chloride, especially soft vinyl chloride, has a relatively high polarity.

Patent Document 2 discloses a two-liquid type curing polyurethane resin composition which has excellent adhesion to mortar and soft vinyl chloride without using a primer. It also describes that such a two-liquid type curing polyurethane resin composition comprises a main agent comprising a urethane prepolymer (A) and a compound having at least one isocyanate group, at least one isocyanurate group and at least one hydrolyzable silicon-containing group, and a curing agent comprising a polyol compound.

Patent Document 3 discloses a urethane adhesive composition having stably excellent adhesion to an adherend (glass) without applying a primer composition. Such a urethane adhesive composition comprises a main agent comprising a urethane prepolymer; and an isocyanate silane compound obtained by reacting trough a biuret body of hexamethylene diisocyanate (HDI biuret body) and 3-(N-phenyl) aminopropyltrimethoxysilane, and a curing agent comprising a polybutadiene diol. It also describes that in the reaction between hexamethylene diisocyanate biuret (HDI biuret) and 3-(N-phenyl)aminopropyltrimethoxysilane, when the ratio of the NCO group/the NH group is within the range of 1.5/1.0 or more and 9.0/1.0 or less, the adhesion of the adhesion-imparting agent is sufficiently exhibited.

Patent Document 4 discloses a moisture curing composition comprising (A) a polymer containing reactive hydroxyl or a hydrolysable group bonded to silicon which groups are reactive in the presence of moisture, (B) a crosslinking agent comprising at least two, and preferably at least three groups reactive with the silicon-bonded hydroxyl or the hydrolysable groups of polymer (A), (C) one or more reinforcing and/or non-reinforcing fillers, and (D) a silane having a specific structure such as bis(3-trimethoxysilylpropyl) amine, wherein the (D) functions as a curing catalyst. It also describes that bis(3-trimethoxysilylpropyl)amine-containing compositions are able to cure the two-part system without adding a tin catalyst.

PRIOR ART DOCUMENTS

Patent Documents

| Patent Document 1 | JP 2005-336429 A |
| Patent Document 2 | JP 2006-111811 A |
| Patent Document 3 | JP 2014-077094 A |
| Patent Document 4 | JP 2017-502147 A |

Since a primer contains a solvent, and there is a concern about the environment, there is a need for primer reduction or abolition (adoption of primerless). If a primer coating step is abolished, volatile organic compounds (VOC) are reduced, a line tact is shortened, and the number of personnel is reduced etc. However, the adoption of primerless leads to adhering a member directly on the surface modification treated resin surface so that the variation of the surface modification level due to the uneven shape of the surface of the member results to the variation of the adhesion strength. Therefore, it is necessary to improve the adhesion strength with respect to the polyolefin based resin in a primerless manner.

However, none of the patent documents 1-4 disclose any technique for adhering to a polyolefin-based resin in a primerless manner.

An object of the present disclosure is to provide a urethane-based adhesive compound comprising at least a urethane prepolymer having an isocyanate group at the end thereof, and a polyfunctional isocyanate compound, having two or more alkoxysilyl group in the molecules, as an adherence agent, which is obtained through a reaction of a silane compound having two or more alkoxysilyl groups in one molecule and a polyisocyanate having a plurality of isocyanate groups.

The urethane-based adhesive of the present invention has high adhesion to a surface of a polyolefin-based resin in a primerless manner. Accordingly, the primerless urethane based adhesive according to the present invention contributes to the reduction of volatile organic compounds (VOC), shortens the line tact, reduction of the personnel cost in the outfitting step of the resin back door for an automobile.

BRIEF DESCRIPTION OF THE DRAWINGS

FIG. 1 is a schematic cross-sectional view of a sample for shear adhesion strength testing.

The urethane-based adhesive of the present invention comprises at least:
(A) a urethane prepolymer having an isocyanate group at the end thereof;
(B) an alkoxysilyl group-containing polyfunctional isocyanate compound which is obtained through a reaction of a silane compound having two or more alkoxysilyl groups in one molecule and a polyisocyanate having an isocyanate group at the end thereof; and
(C) a curing catalyst.

The urethane-based adhesive of the present invention may be a one-liquid type moisture-curing adhesive composition.

The urethane-based adhesive of the present invention may further comprise (D) a polyol to make a two-liquid type adhesive composition which comprises;
a main agent comprising
(A) a urethane prepolymer having an isocyanate group at the end thereof;
(B) an alkoxysilyl group-containing polyfunctional isocyanate compound which is obtained through a reaction of a silane compound having two or more alkoxysilyl groups in one molecule and a polyisocyanate having an isocyanate group at the end thereof; and
(C1) a first curing catalyst; and
a curing product comprising
(D) a polyol; and
(C2) a second curing catalyst.

The urethane prepolymer (A) used as a main component in the adhesive composition in the present invention is a urethane prepolymer having an isocyanate group at the end thereof (hereinafter referred to as NCO-terminated prepolymer). The NCO-terminated prepolymer may be produced by reacting an excess amount of a polyisocyanate compound (in general, OH/NCO=1/1.5-1/4.0) with respect to various polyols in the usual manner. The polyols include, for example, polyether polyol such as polyoxyalkylene polyol, polyether polyol-modified product and polytetramethylene ether glycol; polyester polyol such as condensation-based polyester polyol, lactone-based polyester polyol, and polycarbonate diol; a polyol whose main chain consists of C—C bonds, such as acrylic polyol, polybutadiene-based polyol, polyolefin-based polyol, saponified ethylene-vinyl acetate copolymer; and others such as flame-retardant polyols, phosphorus-containing polyols, and halogen-containing polyol. The polyisocyanate compounds include, for example, tolylene diisocyanate (TDI), 4,4'-diphenylmethane diisocyanate (MDI), xylene diisocyanate (XDI), hexamethylene diisocyanate (HDI), isophorone diisocyanate (IPDI), lysine diisocyanate, isopropylidenebis(4-cyclohexylisocyanate), pentamethylene diisocyanate (PDI), hydrogenated XDI etc.

The alkoxysilyl group-containing polyfunctional isocyanate compound (B) used as an adherence agent in the present invention may be obtained through a reaction of a silane compound having two or more alkoxysilyl groups in one molecule and a polyisocyanate having an isocyanate group at the end thereof.

The silane compound having two or more alkoxysilyl groups in one molecule in order to obtain the adherence agent used in the present invention include, but not limited to, for example, a bissilylamine compound represented by the following chemical formula 1:

[Chemical formula 1]

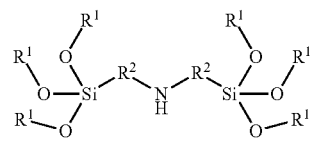

where: each of six $R^1$s is independently an alkyl group having 1 to 3 carbon atoms; and each of two Res is independently an alkylene group having 1 to 10 carbon atoms. More specifically, it is a bis[3-(trimethoxy)silylpropyl]amine represented by the following chemical formula 2:

[Chemical formula 2]

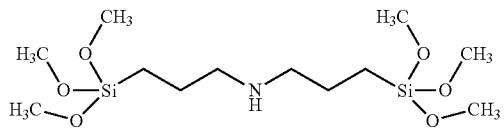

or a N-Phenyl-N-[3-(trimethoxysilyl)propyl]-2-hydroxy-3-(trimethoxysilyl)propoxypropylamine represented by the following chemical formula 3:

[Chemical formula 3]

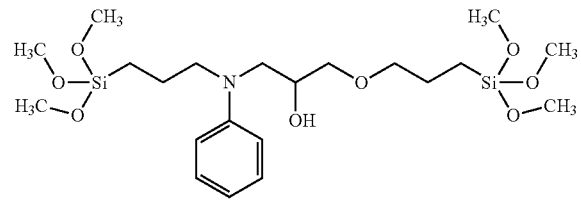

The diisocyanates which constitutes the polyisocyanate having an isocyanate group at the end thereof in order to obtain the adherence agent in the present invention includes, but not limited to, for example, an aromatic isocyanates such as tolylene diisocyanate (TDI), 4,4'-diphenylmethane diisocyanate (MDI), xylene diisocyanate (XDI); and an aliphatic isocyanate such as hexamethylene diisocyanate (HDI), pentamethylene diisocyanate (PDI), lysine diisocyanate, isophorone diisocyanate (IPDI), isopropylidenebis(4-cyclohexylisocyanate) and hydrogenated XDI.

The polyisocyanate includes, but not limited to, more specially, an isocyanurate-type polyfunctional isocyanate being a cyclic trimer of a diisocyanate represented by the following chemical formula 4:

[Chemical formula 4]

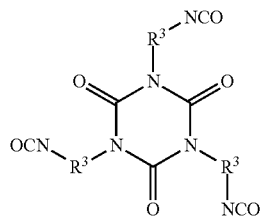

where: each of three $R^3$s is independently a linear or cyclic alkylene group which may be substituted with an alkyl group, an alkoxysilyl group, an acyl group, an alkoxycarbonyl group or a carboxyl group; or an organic group having a phenylene group which may be substituted with an alkyl group, an alkoxysilyl group, an acyl group, an akoxycarbonyl group or a carboxyl group;

a biuret-type polyfunctional isocyanate being an adduct of a diisocyanate to a urea group formed of a diisocyanate and an amine, wherein the polyisocyanate is represented by the following chemical formula 5:

[Chemical formula 5]

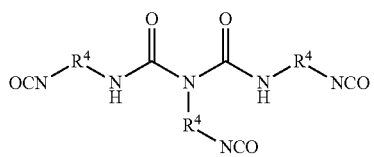

where: each of three $R^4$s is independently a linear or cyclic alkylene group which may be substituted with an alkyl group, an alkoxysilyl group, an acyl group, an alkoxycarbonyl group or a carboxyl group; or an organic group having a phenylene group which may be substituted with an alkyl group, an alkoxysilyl group, an acyl group, an alkoxycarbonyl group or a carboxyl group;

an adduct-type polyfunctional isocyanate being an adduct of a diisocyanate to a poly-hydric alcohol, wherein the polyisocyanate is represented by the following chemical formula 6:

[Chemical formula 6]

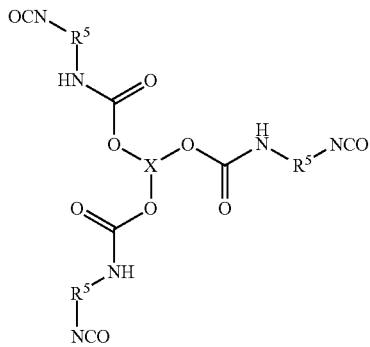

where: each of three $R^5$s is independently a linear or cyclic alkylene group which may be substituted with an alkyl group, an alkoxysilyl group, an acyl group, an alkoxycarbonyl group or a carboxyl group; or an organic group having a phenylene group which may be substituted with an alkyl group, an alkoxysilyl group, an acyl group, an alkoxycarbonyl group or a carboxyl group, and X is a trivalent hydrocarbon group having 1 to 3 carbon atoms; and an allophanate-type polyfunctional isocyanate being an adduct of a diisocyanate to a urethane group formed of a diisocyanurate and an alcohol, wherein the polyisocyanate is represented by the following chemical formula 7:

[Chemical formula 7]

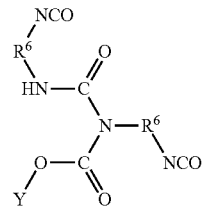

where: each of two $R^6$s is independently a linear or cyclic alkylene group which may be substituted with an alkyl group, an alkoxysilyl group, an acyl group, an alkoxycarbonyl group or a carboxyl group; or an organic group having a phenylene group which may be substituted by any of an alkyl group, an alkoxysilyl group, an acyl group, an alkoxycarbonyl group or a carboxyl group, and Y is an alkyl group having 1 to 3 carbon atoms.

The polyisocyanate compound having an isocyanate group at the end thereof in order to obtain the adherence agent in the present invention further includes, for example, a polyurethane prepolymer represented by the following chemical formula 8:

[Chemical formula 8]

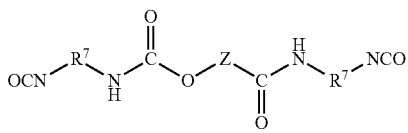

where: each of two $R^7$s is independently a linear or cyclic alkylene group which may be substituted by any of an alkyl group, an alkoxysilyl group, an acyl group, an alkoxycarbonyl group or a carboxyl group; or an organic group having a phenylene group which may be substituted by any of an alkyl group, an alkoxysilyl group, an acyl group, an alkoxycarbonyl group or a carboxyl group, and Z is an oxyalkylene group having 1 to 40 carbon atoms, which may be substituted.

The oxyalkylene group having 1 to 40 carbon atoms, which may be substituted with an alkylene group having 1 to 3 carbon atoms, being represented by Z in the above polyurethane prepolymer, includes, but not limited to, for example, the oxyalkylene groups represented by the following chemical formula 9:

[Chemical formula 9]

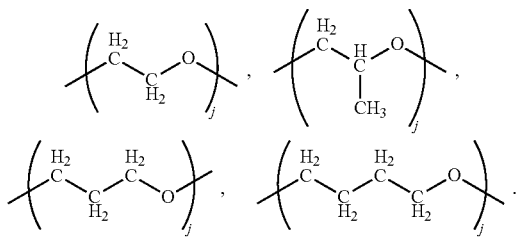

The adherence agent used in the present invention may be obtained through a reaction of the above silane compound and the above polyisocyanate. A polyfunctional isocyanate compound having two or more alkoxysilyl groups may be obtained by bonding at least one isocyanate group of a plurality of isocyanate groups which the polyisocyanate has and a functional group of a silane compound. As such a polyfunctional isocianate compound, one example of a bissilylamine group-bonded polyfunctional isocyanate compound which may be obtained through a reaction of a hexamethylene diisocyanate (HDI) biuret and a bis[3-(trimethoxy)silylpropyl]amine is represented by the following chemical formula 10:

[Chemical formula 10]

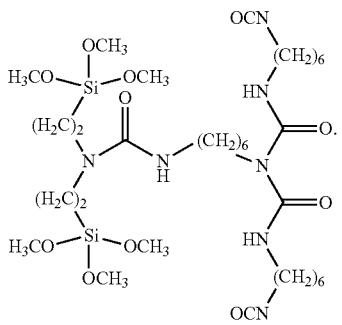

The content of the component (B) is 0.5 parts by weight or more, preferably 1.0 parts by weight or more, and more preferably 2 parts by weight or more based on 100 parts by weight of the component (A) of the present invention. The upper limit of the content of the component (B) is 20 parts by weight or less, preferably 15 parts by weight or less, and more preferably 10 parts by weight or less.

The ratio of NCO group/NH group in the adherence agent of the present invention is 1.5 or more, preferably 2.0 or more, more preferably 2.7 or more. The upper limit of the ratio is 4.0 or less, preferably 3.7 or less, the most preferably 3.5 or less. When the ratio of NCO group/NH group is below 1.5, the amount of the NCO group in the adherence agent becomes lower and the extent of the reaction with the prepolymer is reduced, so that the adhesiveness cannot be enhanced. When the ratio of NCO group/NH group is above 4.0, the amount of the silyl group in the adherence agent becomes higher and the amount of the addition of the adherence agent is needed to increase, so that there is an adverse effect on economy and other physical properties.

The curing catalyst (C) used in order to cure the adhesive composition in the present invention includes, for example, an organotin compound (dibutyltin diacetylacetonate, dibutyltin dilaurate, tin octylate, dibutyltin dimaleate); 2,2'-dimorpholinodiethyl ether, di(2,6-dimethylmorpholinoethyl) ether; bismuth carboxylate (such as bismuth 2-ethylhexanoate, bismuth octylate, and bismuth neodecanoate); carboxylic acid (such as benzoic acid, phthalic acid, 2-ethylhexanoic acid, octyl acid, stearic acid, oleic acid, and linoleic acid); triethylenediamine and a salt thereof; N,N-dimethylaminoethylmorpholine; bis(2-dimethylaminoethyl) ether; 1,8-diazabicyclo(5,4,0)undecene-7 and a salt thereof (such as phenol salt, octyl acid salt, oleic acid salt, p-toluenesulfonic acid salt, and formic acid salt); imidazole-based compound (such as 2-methylimidazole, 2-undecylimidazole, 2-heptadecyl imidazole, 2-ethyl-4-methylimidazole, 2-phenylimidazole, 2-phenyl-4-methylimidazole, 1-benzyl-2-methylimidazole, 1-benzyl-2-phenylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 1-cyanoethyl-2-undecylimidazolium trimellitate, 2,4-diamino-6-[2'-methylimidazolyl-(1')]-ethyl-s-triazine, 2,4-diamino-6-[2'-undecylimidazolyl-(1')]-ethyl-s-triazine, 2,4-diamino-6-[2'-ethyl-4'-methylimidazolyl-(1')]-ethyl-s-triazine, 2,4-diamino-6-[2'-methylimidazolyl-(1')]-ethyl-s-triazine isocyanuric acid adduct, 2-phenylbenzimidazole isocyanuric acid adduct, 2-methylbenzimidazole isocyanuric acid adduct, 2-phenyl-4,5-dihydroxymethylimidazole, 2-phenyl-4-methyl-5-hydroxymethylimidazole 2-phenylimidazoline, and 2,3-dihydro-1H-pyrrolo[1,2-a]benzimidazole). In general, an amount of the catalyst may be determined within a range of 0.005-0.5% in the entire amount of the composition.

The polyol (D) contained, when the urethane-based adhesive of the present invention is the two-liquid type adhesive composition, includes, for example, polyoxyalkylene polyol; polyester polyol such as condensation-based polyester polyol, lactone-based polyester polyol and polycarbonate polyol; polyol whose main chain is consisted of the C—C bound such as acrylic polyol, polybutadiene-based polyol, polyolefin-based polyol, and saponified ethylene-vinyl acetate copolymer; and other flame-retardant polyols, phosphorus-containing polyol, halogen-containing polyol etc. Among the polyols, diols and triols are preferred.

The polyoxyalkylene polyol is a compound which is obtained by polymerizing ethylene oxide, propylene oxide, butylene oxide etc. using diol, triol, tetraol etc. as an initiator. The polyoxyalkylene polyol includes, for example, polyethylene glycol, polypropylene glycol (PPG), polyoxypropylene triol, ethylene oxide/propylene oxide copolymers, polytetramethylene ether glycol (PTMEG), polytetrafluoroethylene, and sorbitol-based polyols. Among them, polypropylene glycol and/or polyoxypropylene triol is preferable because it is excellent in balance of hardness and breaking elongation of the composition containing a liquid component and balance of cost.

A polyol having a weight-average molecular weight of about 100 to 10,000 is preferred, and a polyol having a weight-average molecular weight of 1000 to 5000 is more preferable. When the weight-average molecular weight is within this range, physical properties (for example, hardness, breaking strength, breaking elongation) and a viscosity of the urethane prepolymer produced by the reaction with the polyisocyanate compound described later are good.

The polyol (D) contained, when the urethane-based adhesive of the present invention is the two-liquid type adhesive composition, is not limited to the above polyol and at least a part of the polyol may be replaced with, for example, a hydrophobic polyol such as a hydrogenated polyisoprene polyol, a rosin-modified polyol, a polybutadiene polyol etc. represented by the following chemical formulas. Since the two-liquid type urethane adhesive of the present invention contains these hydrophobic polyols, it is possible to further improve adhesion to a hardly adhesive resin adherend such as a polyolefin resin even if surface treatment is not sufficient by partially reacting with an alkoxysilyl group-containing polyfunctional isocyanate compound. More preferably, the hydrophobic polyol is added to the curing agent.

[Chemical formula 11]

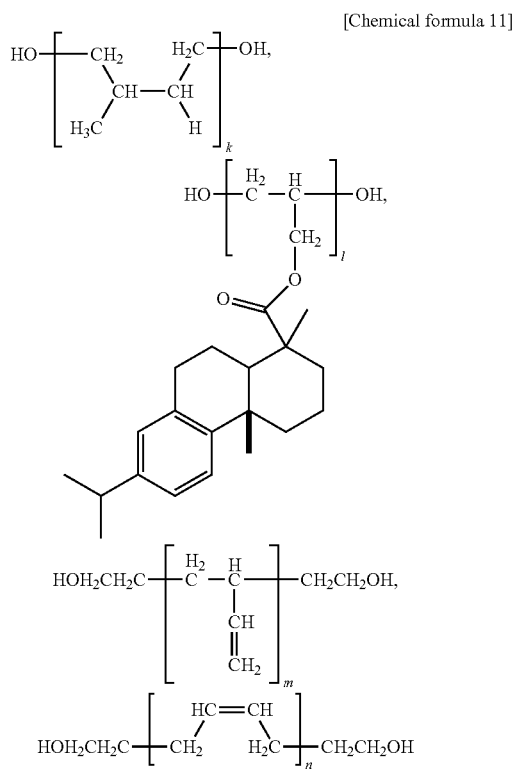

when: each of k, l, m, n independently represents an integral number.

Other additives used for the urethane-based adhesive of the present invention are, for example, a filler or a plasticizer.

The filler includes, for example, calcium carbonate, silica, carbon black, clay, glass balloon, silica balloon, ceramic balloon, plastic balloon, talc, titanium oxide, quicklime, kaolin, zeolite and diatomaceous earth. In general, the amount of the filler may be determined within a range of 5-50% in the entire amount of the composition.

The plasticizer includes, for example, diisononyl phthalate, diisononyl cyclohexane 1,2-dicarboxylate (DINCH), dioctyl phthalate (DOP), dibutyl phthalate, dilauryl phthalate, butylbenzyl phthalate, dioctyl adipate, diisodecyl adipate, trioctyl phosphate, tris(chloroethyl) phosphate, tris(dichloropropyl) phosphate, adipic acid propylene glycol polyester, adipic acid butylene glycol polyester, epoxystearic acid alkyl, alkylbenzene, epoxidized soybean oil etc. In general, the amount of the plasticizer may be determined within a range of 5 to 50% of the entire amount of the composition.

In addition, an appropriate amount of an anti-aging agent, an antioxidant, a foaming agent, an ultraviolet absorber, a flame retardant, and a pigment etc. may be added.

EXAMPLES

1. Prepolymer 350 g of a 4,4'-diphenylmethane diisocyanate (MDI) was added to 3000 g of a polyoxypropylenetriol having a hydroxyl value of 25.0, and they were reacted at 80° C. for 3 hours under a nitrogen atmosphere to prepare a NCO-terminated prepolymer having a NCO % content of 1.90% and a viscosity (20° C.) of 50000 MPa·s. Here, the NCO % content was measured according to JIS K 0113 by a potential difference titration method.

2. Adherence Agent (1) An Adherence Agent for Comparison

For comparison, a 3-(triethoxysilyl)propyl isocyanate was prepared as an adherence agent A instead of the conventional silane compounds, which is represented by the following chemical formula 12:

[Chemical formula 12]

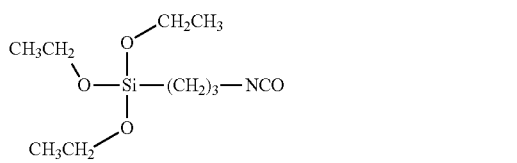

Preparing a N-3-(trimethoxysilyl)propyl-N-phenylamine represented by the following chemical formula 13:

[Chemical formula 13]

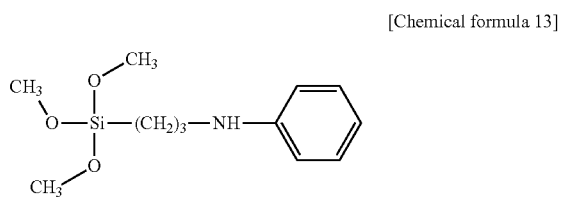

and a 3-(trimethoxysilyl)propanethiol represented by the following chemical formula 14:

[Chemical formula 14]

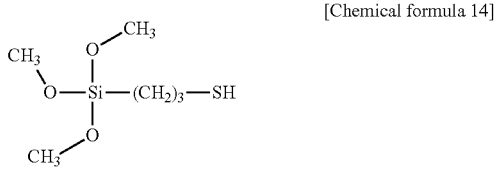

and each of them was reacted with a biuret hexamethylene diisocyanate (HDI biuret) represented by the following chemical formula 15:

[Chemical formula 15]

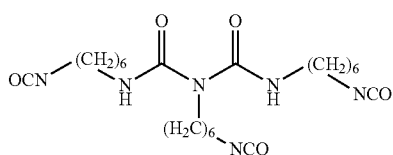

to prepare an adherence agent B and an adherence agent C having a NCO % content of 10%.

(2) An Adherence Agent of the Present Invention

A bis[3-(trimethoxy)silylpropyl] amine, as the adherence agent of the present invention, represented by the chemical formula 16:

[Chemical formula 16]

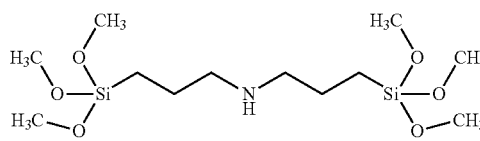

was reacted with a HDI biuret to prepare an adherence agent D having a NCO % content of 10%.

Preparing a bis[3-(trimethoxy)silylpropyl]amine as the adherence agent of the present invention, it was reacted with an allophanate type hexamethylene diisocyanate (HDI allophanate) represented by the chemical formula represented by the chemical formula 17:

[Chemical formula 17]

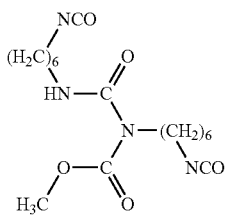

to prepare an adherence agent E having a NCO % content of 10%.

Preparing a bis[3-(trimethoxy)silylpropyl]amine as the adherence agent of the present invention, it was reacted with an isocyanurate type hexamethylene diisocyanate (HDI isocyanurate) represented by the chemical formula 18:

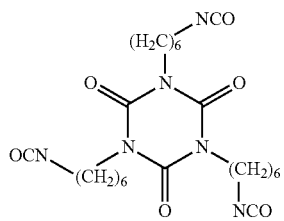

to prepare an adherence agent F having a NCO % content of 10%.

Preparing a bis[3-(trimethoxy)silylpropyl]amine as the adherence agent of the present invention, it was reacted with a urethane prepolymer (NCO-terminated prepolymer) having an isocyanate group at the end thereof to prepare an adherence agent G having a NCO % content of 1.6%.

The NCO-terminated prepolymer may be the same with and different from the prepolymer used as the main component of the adherence agent. Here, 350 g of 4,4'-diphenylmethane diisocyanate (MDI) was added to 3000 g of polyoxypropylenetriol having a hydroxyl value of 25.0, and they were reacted at 80° C. for 3 hours under a nitrogen atmosphere to prepare a NCO-terminated prepolymer having a NCO % content of 1.90% and a viscosity (20° C.) of 50000 mPa·S.

3. Preparation of a Two-Liquid Type Adhesive Composition

Main agents for the two-liquid type adhesive compositions were prepared according to the respective formulations shown in Table 1.

TABLE 1

| | | | | | | | | | (weight %) |
| | main agent component | Main agent 1 | Main agent 2 | Main agent 3 | Main agent 4 | Main agent 5 | Main agent 6 | Main agent 7 | Main agent 8 |
|---|---|---|---|---|---|---|---|---|---|
| | urethane prepolymer | 38.0 | 38.0 | 38.0 | 38.0 | 38.0 | 38.0 | 38.0 | 28.0 |
| adherence agent | A | | 3.0 | | | | | | |
| | B | | | 3.0 | | | | | |
| | C | | | | 3.0 | | | | |
| | D | | | | | 3.0 | | | |
| | E | | | | | | 3.0 | | |
| | F | | | | | | | 3.0 | |
| | G | | | | | | | | 13.0 |
| carbon black | Mixture of Carbon black 1/Carbon black 2 (mass ratio = 70/30) | 20.0 | 20.0 | 20.0 | 20.0 | 20.0 | 20.0 | 20.0 | 20.0 |
| filler | calcium carbonate | 21.0 | 21.0 | 21.0 | 21.0 | 21.0 | 21.0 | 21.0 | 21.0 |
| plasticizer | diisononyl phthalate | 20.0 | 17.0 | 17.0 | 17.0 | 17.0 | 17.0 | 17.0 | 17.0 |
| catalyst | 2,2'-dimorpholino diethyl ether | 1.0 | 1.0 | 1.0 | 1.0 | 1.0 | 1.0 | 1.0 | 1.0 |
| | total | 100 | 100 | 100 | 100 | 100 | 100 | 100 | 100 |

Carbon black 1: Niteron #200 produced by Shinnichika carbon
Carbon black 2: Niteron #300 produced by Shinnichika carbon Curing agents for the two-liquid type adhesive compositions are prepared according to the respective formulations shown in Table 2.

|  | curing agent component | Curing agent 1 | Curing agent 2 | Curing agent 3 | (weight %) Curing agent 4 |
|---|---|---|---|---|---|
| diol | PPG diol *1 | 68.0 | 45.0 | 45.0 | 45.0 |
|  | hydrogenated polyisoprene diol *2 |  | 23.0 |  |  |
|  | rosin-modified diol *3 |  |  | 23.0 |  |
|  | polybutadiene diol *4 |  |  |  | 23.0 |
| filler | calcium carbonate | 30.0 | 30.0 | 30.0 | 30.0 |
| catalyst | 1,8-diazabicyclo[5,4,0]-undesen7-octylate | 2.0 | 2.0 | 2.0 | 2.0 |
|  | total | 100 | 100 | 100 | 100 |

*1: Asahi Glass Co., Ltd. Exenol 2020 Diol with a number average molecular weight of 200 (OH value: 56 mgKOH/g)
*2: Idemitsu Kosan Co., Ltd. Poly ip (Hydroxy group content 0.83 mol/kg, number average molecular weight 2500)
*3: Arakawa Chemical Industries, Ltd. D-6011 (Hydroxyl value 120 mgKOH/g)
*4: Idemitsu Kosan Co., Ltd. Poly bd R-45HT (Hydroxy group content 47 mgKOH/g, number average molecular weight 2800)

4. Adhesion Strength to Glass Fiber Reinforced Polypropylene

Plasma treatment was performed on 3 mmt glass fiber reinforced polypropylene ("PP-GF40", hereinafter referred to as "PPGF") possessed by Sunstar Engineering Inc. to obtain PPGF plates with two types of surface treatment levels.

The surface treatment level in the plasma treatment measures a wetting index (dyne) according to JIS K 6768. The wetting index is measured at 23° C. under a standard test chamber atmosphere at a relative humidity of 50%. On the test specimens, a mixed liquid for test (a liquid prepared by mixing stepwise ethylene glycol monoethyl ether, formamide, methanol, and water in a predetermined ratio) is spread over the surface of the test specimens using a cotton swab. After 2 seconds, a liquid film is visually observed at a bright place to confirm whether or not tearing occurs. When tearing occurs, a similar procedure is carried out with a mixed liquid having a low surface tension, and when tearing does not occur, a similar procedure is carried out with a mixed liquid having a high surface tension. This operation is repeated to measure the wetting index. The higher the wetting index measured in this way is, the higher the hydrophilicity is, that is, the higher the improvement of the surface treatment level is. Typically, the surface treatment level specifications required in automotive manufacturing are 42 dyne to 55 dyne. Therefore, a surface treatment level showing a wetting index of less than 42 dyne is insufficient in surface treatment, and the adhesive having the high adhesion strength even with such conditions is determined to be excellent.

Then, in this experiment, plasma treatment was performed on the PPGF to prepare a surface-treated PPGF plate A showing a wetting index of 42 dyne which is a lower limit of the specifications, and a surface-treated PPGF plate B showing a 35 dyne wetting index below the lower limit.

Each surface-treated PPGF plate was cut into a size of 100 mm×25 mm to prepare PPGF test specimens 1. A shear adhesion strength test sample (FIG. 1) was prepared by applying each adhesive so that the thickness is 3 mmt between the PPGF test specimen 1 and the electrodeposition coated steel sheet 2 cut to a size of 100 mm×25 mm, and curing them. The thickness is indicated with the value before curing, and the thickness of the adhesive does not change before and after curing. Here, by using an electrodeposition coated steel sheet for an adherend, one side of the test specimens is surely adhered to the adhesive.

The shear adhesion strength test sample prepared in this way was mounted on a tensile strength tester, and the PPGF test specimens 1 and the electrodeposition coated steel sheet 2 were pulled in the reverse direction at a speed of 200 mm/min to confirm the failure state. The evaluation criteria of the failure state are as follows:

A: cohesive failure of the adhesive layer
B: partial interfacial failure between PPGF and the adhesive layer
C: complete interfacial failure between PPGF and the adhesive layer Each adhesive was prepared by mixing the main agent shown in Table 1 and the curing agent shown in Table 2 at a ratio of 1 part by weight of the curing agent to 10 parts by weight of the main agent.

The value of the shear adhesion strength measured after storing the shear adhesion strength test sample for 3 days at 20° C. and 65% RH was used as an initial characteristic, and after the storage, the value of the shear adhesion strength measured after heating the sample at 100° C. for 400 hours was evaluated as a heat resistance, and the results are shown in Table 3.

TABLE 3

|  |  |  | adhesive evaluation to PPGF *1 | | | |
|---|---|---|---|---|---|---|
|  | main agent | curing agent | initial characteristic *2 | | heat resistance characteristic *3 | |
|  |  |  | Plate A | Plate B | Plate A | Plate B |
| Comparative example 1 | 1 | 1 | C 1.2 | C 0.8 | C 1.0 | C 0.9 |
| Comparative example 2 | 2 | 1 | B 2.1 | B 2.0 | C 1.3 | C 1.1 |

TABLE 3-continued

|  | main agent | curing agent | adhesive evaluation to PPGF *1 | | | |
|---|---|---|---|---|---|---|
|  | | | initial characteristic *2 | | heat resistance characteristic *3 | |
|  | | | Plate A | Plate B | Plate A | Plate B |
| Comparative example 3 | 3 | 1 | A 3.0 | B 2.7 | B 2.9 | C 1.2 |
| Comparative example 4 | 4 | 1 | A 3.1 | B 2.6 | B 2.5 | C 1.1 |
| Example 1 | 5 | 1 | A 3.3 | A 3.1 | A 3.4 | B 2.2 |
| Example 2 | 6 | 1 | A 3.2 | A 3.1 | A 3.3 | B 2.0 |
| Example 3 | 7 | 1 | A 3.3 | A 3.1 | A 3.4 | B 2.4 |
| Example 4 | 8 | 1 | A 3.1 | A 3.0 | A 3.2 | B 2.2 |
| Example 5 | 5 | 2 | A 3.6 | A 3.5 | A 3.7 | A 3.5 |
| Example 6 | 5 | 3 | A 3.8 | A 3.7 | A 3.8 | A 3.6 |
| Example 7 | 5 | 4 | A 3.8 | A 3.6 | A 3.6 | A 3.5 |

*1: A cohesive failure of an adhesive layer:
B partial interfacial failure between PPGF and an adhesive layer;
C complete interfacial failure between PPGF and an adhesive layer.
*2: Shear test was carried out after storing for 3 days at 20° C. and 65% RH.
*3: After the storage, shear test was carried out after the load test at 100° C. for 400 days.

5. Test Results
(1) Influence on Adhesion of Silane Compound Constituting an Adherence Agent Comparative example 1 represents a result of an adherence agent-free adhesive.

For the PPGF plate A of the surface treatment level of 42 dyne at an initial stage, the adhesive layer caused interfacial rupture from PPGF at 100% area.

Comparative examples 2-4 represent respectively the results of adhesives prepared by conventional adherence agents (adherence agents A-C). Although the initial characteristics were improved, especially for the PPGF plate B of the surface treatment level insufficient for 35 dyne, the heat resistance was poor.

Example 1 represents the result of an adhesive prepared with the adherence agent D of the present invention using bis[3-(trimethoxy)silylpropyl]amine as a silane compound constituting the adherence agent.

The initial characteristic was improved and the cohesive failure of the adhesive layer was observed with respect to the PPGF plate B having 35 dyne which was an insufficient surface treatment level, that is, the adhesion strength to PPGF was excellent. In addition, the heat resistance was improved and the adhesive layer did not completely break away from PPGF with respect to the PPGF plate B having 35 dyne which was an insufficient surface treatment level.

(2) Influence on Adhesion of Polyfunctional Isocyanate Constituting an Adherence Agent Examples 2-4 represent respectively the results of an adhesive prepared by the reaction of bis[3-(trimethoxy) silylpropyl]amine and various polyfunctional isocyanates, as a silane compound constituting the adherence agent and prepared with the adherence agents E-G of the present invention As in Example 1, the initial characteristics were improved and the cohesive failure of the adhesive layer was observed with respect to the PPGF plate B having 35 dyne which was an insufficient surface treatment level, that is, the adhesion strength to PPGF was excellent. In addition, the heat resistance was improved and the adhesive layer did not completely break away from PPGF with respect to the PPGF plate B having 35 dyne which was an insufficient surface treatment level.

(3) Influence on Adhesion of Polyol

Examples 5-7 represent the results of an adhesive prepared by submitting a part of PPG diol with a hydrogenated polyisoprene diol, a rosin-modified diol, and a polybutadiene diol, each of which used a bis[3-(trimethoxy)silylpropyl]amine as a silane compound constituting an adherence agent in the same manner as in Example 1 as an adherence agent.

When a hydrophobic polyol such as hydrogenated polyisoprene diol, rosin-modified diol and polybutadiene diol was used in at least a portion of the polyol, heat resistance was further improved with respect to the PPGF plate B having 35 dyne which was the insufficient surface treatment level, and cohesive failure of the adhesive layer was observed, that is, adhesion strength to PPGF was excellent.

INDUSTRIAL APPLICABILITY

The heat-curable urethane-based adhesive of the present invention exhibits high adhesion without using a primer even if the surface treatment level of a back door (resin back door) employing a PP-based resin as a structural material is insufficient in an automotive manufacturing process.

DESCRIPTION OF REFERENCE NUMERALS

1: a glass fiber reinforced polypropylene plate
2: an electrodeposition coated steel sheet
3: an adhesive layer

What is claimed is:
1. A two-liquid type urethane-based adhesive comprises at least:
   a main agent comprising:
   (A) a urethane prepolymer having an isocyanate group at the end thereof;
   (B) an alkoxysilyl group-containing polyfunctional isocyanate compound which is obtained through a reaction of a silane compound having two or more alkoxysilyl groups in one molecule and a polyisocyanate having an isocyanate group at the end thereof, wherein the silane compound having two or more alkoxysilyl groups in one molecule is a bissilylamine compound represented by the following chemical formula 1:

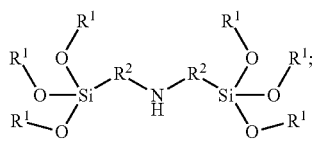

[Chemical formula 1]

where: each of six $R^1$s is independently an alkyl group having 1 to 3 carbon atoms; and
each of two $R^2$s is independently an alkylene group having 1 to 10 carbon atoms, and
wherein the polyisocyanate is a polyfunctional isocyanate compound selected from a group consisting of:
  an isocyanurate-type polyfunctional isocyanate being a cyclic trimer of a diisocyanate, wherein the polyisocyanate is represented by the following chemical formula 4:

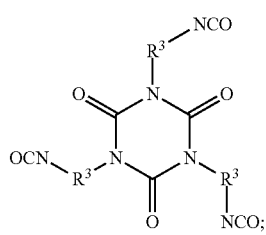

[Chemical formula 4]

where: each of three $R^3$s is independently a linear or cyclic alkylene group which may be substituted with an alkyl group, an alkoxysilyl group, an acyl group, an alkoxycarbonyl group or a carboxyl group; or an organic group having a phenylene group which may be substituted with an alkyl group, an alkoxysilyl group, an acyl group, an akoxycarbonyl group or a carboxyl group;
  a biuret-type polyfunctional isocyanate being an adduct of a diisocyanate to a urea group formed of a diisocyanate and an amine, wherein the polyisocyanate is represented by the following chemical formula 5:

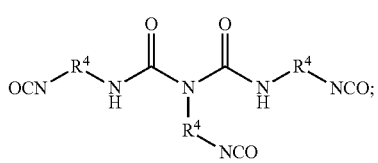

[Chemical formula 5]

where: each of three $R^4$s is independently a linear or cyclic alkylene group which may be substituted with an alkyl group, an alkoxysilyl group, an acyl group, an alkoxycarbonyl group or a carboxyl group; or an organic group having a phenylene group which may be substituted with an alkyl group, an alkoxysilyl group, an acyl group, an alkoxycarbonyl group or a carboxyl group;
  an adduct-type polyfunctional isocyanate being an adduct of a diisocyanate to a poly-hydric alcohol, wherein the polyisocyanate is represented by the following chemical formula 6:

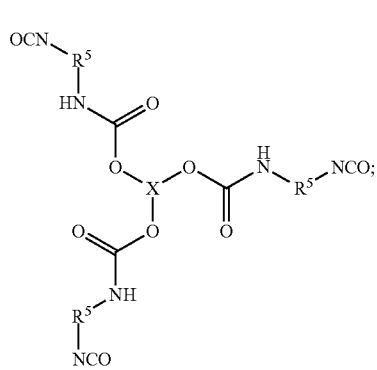

[Chemical formula 6]

where: each of three $R^5$s is independently a linear or cyclic alkylene group which may be substituted with an alkyl group, an alkoxysilyl group, an acyl group, an alkoxycarbonyl group or a carboxyl group; or an organic group having a phenylene group which may be substituted by any of an alkyl group, an alkoxysilyl group, an acyl group, an alkoxycarbonyl group or a carboxyl group, and X is a trivalent hydrocarbon group having 1 to 3 carbon atoms; and
  an allophanate-type polyfunctional isocyanate being an adduct of a diisocyanate to a urethane group formed of a diisocyanate and an alcohol, wherein the polyisocyanate is represented by the following chemical formula 7:

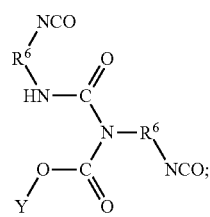

[Chemical formula 7]

where: each of two $R^6$s is independently a linear or cyclic alkylene group which may be substituted with an alkyl group, an alkoxysilyl group, an acyl group, an alkoxycarbonyl group or a carboxyl group; or an organic group having a phenylene group which may be substituted by any of an alkyl group, an alkoxysilyl group, an acyl group, an alkoxycarbonyl group or a carboxyl group, and Y is an alkyl group having 1 to 3 carbon atoms; and
  (C1) a first curing catalyst, and
a curing product comprising
  (D) a hydrophobic polyol and a polyoxyalkylene polyol, and
  (C2) a second curing catalyst.

2. The two-liquid type urethane-based adhesive according to claim 1, wherein (A) the urethane prepolymer having an isocyanate group at the end thereof is a prepolymer formed by a reaction through a polyol and an isocyanate.

3. The two-liquid type urethane-based adhesive according to claim 2, wherein at least a part of the polyol is one or more polyol selected from a group consisted of a hydrogenated polyisoprene polyol, a rosin-modified polyol and a polybutadiene polyol.

4. The two-liquid type urethane-based adhesive according to claim 1, wherein the polyfunctional isocyanate compound having an alkoxysilyl group is a bissilylamine group-bonded polyfunctional isocyanate compound represented by the following chemical formula 10:

[Chemical formula 10]

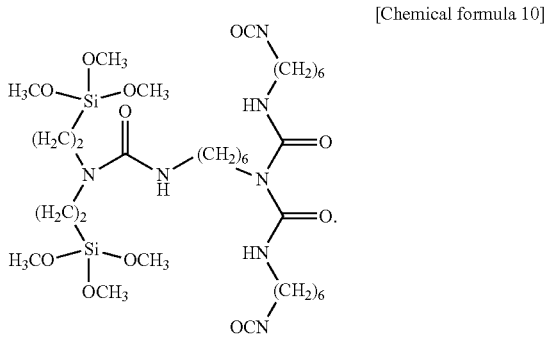

5. The two-liquid type urethane-based adhesive according to claim 1, wherein the (D) hydrophobic polyol is selected from a group consisted of a hydrogenated polyisoprene polyol, a rosin-modified polyol, and a polybutadiene polyol.

6. The two-liquid type urethane-based adhesive according to claim 1 further comprising a filler or a plasticizer.

7. The two-liquid type urethane-based adhesive according to claim 1, wherein (C1) the first curing catalyst and (C2) the second curing catalyst are respectively selected from the group consisting of an organotin compound; 2,2'-dimorpholinodiethyl ether, di(2,6-dimethylmorpholinoethyl)ether; bismuth carboxylate; carboxylic acid; triethylenediamine and a salt thereof; N,N-dimethylaminoethylmorpholine; bis (2-dimethylaminoethyl) ether; 1,8-diazabicyclo(5,4,0)undecene-7 and a salt thereof; imidazole-based compound.

8. The two-liquid type urethane-based adhesive according to claim 1, wherein the polyoxyalkylene polyol has a weight-average molecular weight of 100 to 10,000.

* * * * *